United States Patent [19]

Fargo et al.

[11] Patent Number: 5,467,599
[45] Date of Patent: Nov. 21, 1995

[54] METHOD FOR REDUCING SEAL STICTION IN A FLUID CYLINDER

[75] Inventors: Richard N. Fargo, Plainville; William A. Wurts, Wethersfield, both of Conn.

[73] Assignee: Otis Elevator Company, Farmington, Conn.

[21] Appl. No.: 996,346

[22] Filed: Dec. 23, 1992

[51] Int. Cl.$^6$ .................................................. F16D 31/02
[52] U.S. Cl. .............................. 60/478; 277/24; 277/59; 277/63
[58] Field of Search ........................... 60/477, 478, 479, 60/481; 187/110; 277/24, 59, 63

[56] References Cited

U.S. PATENT DOCUMENTS

| | | | |
|---|---|---|---|
| 3,216,651 | 11/1965 | King et al. | 277/59 |
| 3,514,114 | 5/1970 | Monahan | 277/59 |
| 3,912,284 | 10/1975 | Gosling et al. | 277/59 X |
| 3,943,717 | 3/1976 | Schexnayder | 277/59 X |
| 4,055,107 | 10/1977 | Bartley | 277/24 X |
| 4,189,157 | 2/1980 | Mahan et al. | 277/59 X |
| 4,222,575 | 9/1980 | Sekiguchi et al. | 277/59 |

FOREIGN PATENT DOCUMENTS 3002577 7/1981 Germany ........................... 187/110

*Primary Examiner*—Edward K. Look
*Assistant Examiner*—Hoang Nguyen

[57] ABSTRACT

An apparatus and a method for reducing seal stiction is provided. In the method, a first step provides a fluid cylinder comprising a piston displacably mounted in a housing containing pressurized fluid is provided in the first step. The housing has first and second seals in register with the piston. In a second step, the second seal is applied to maintain pressure within the housing when the piston is in a static state. In a third step, the first seal is applied to maintain pressure within the housing and the second seal relaxed prior to displacement of the piston. In a fourth step, the second seal is applied to maintain pressure within the housing and the first seal relaxed subsequent to the displacement of the piston. An apparatus is provided for applying one of the first or second seals and relaxing the other of the first or second seals, before and after displacement of the piston.

10 Claims, 2 Drawing Sheets

METHOD FOR REDUCING SEAL STICTION IN A FLUID CYLINDER

DESCRIPTION

1. Technical Art

The present invention pertains to fluid powered cylinders in general, and to motion control of fluid powered cylinders in particular.

2. Background Art

It is well known in the art that linear motion may be created by introducing pressurized fluid into a sealed cylindrical housing having a piston displacably mounted therein. In a single acting cylinder, the piston will extend out of the housing when the pressure of the fluid pressing against the end of the piston is great enough to overcome the loading parallel to the stroke of the piston. Likewise, when the pressure of the fluid provides insufficient force to overcome the loading perpendicular to the stroke of the piston, the piston will retract within the housing. In one version of a single acting cylinder, the section of piston within the housing is a constant diameter cylinder. The other end of the piston is typically attached to an object positioned above the housing and gravity is used to return the piston into the housing. Physical stops within the housing prevent the piston from retracting completely into, or extending completely out of, the housing. One or more seals in contact with the piston prevent pressurized fluid from leaking out of the housing and therefore maintain the pressure difference between the fluid inside the housing and the environment outside. A port enables fluid to enter or exit the housing.

In a double acting cylinder, the piston comprises a cap and a rod and can be extended or retracted under power. The piston includes at least one seal in the cap in contact with the inner diameter of the housing and at least one seal in the housing in contact with the rod. The cap seal prevents higher pressure fluid from leaking past the cap in either direction and the rod seal prevents fluid from leaking out of the housing along the rod. Thus, the seals create two discrete pressure compartments: a cap end compartment between the cap and the end of the housing and a rod end compartment between the cap and the end of the housing on the rod side of the cap. Similar to the single action cylinder described above, physical stops within the housing prevent the piston from retracting completely into, or extending completely out of, the housing. A first port enables fluid to enter or exit the housing in the cap end of the cylinder. A second port enables fluid to enter or exit the rod end of the cylinder. A pressure difference of sufficient magnitude across the piston cap will cause the piston to retract or extend depending on which side of the cap is pressurized.

In either the single or double acting cylinder, the amount of force necessary to move the piston depends on whether the piston is moving or not. In a dynamic state, the amount of force is not time dependant. In a static state, however, the amount of force required to move the piston changes as a function of time. Immediately after the cylinder piston stops, the seal in contact with the piston begins to conform with the sealing surface of the piston. On a microscopic level this can be described as the seal and the seal surface becoming mating male and female surfaces, since the sealing surface is never absolutely flat and the seal will begin to enter the microscopic indentations in the surface. As more of the seal and sealing surface conform into microscopic mating surfaces, the amount of force required to move the static piston increases as well.

The difference in force necessary to move the piston between the static state and the dynamic state causes a motion control problem known in the art as "stiction". The control problem occurs when, because of energy stored in the oil and any elastic volume containing the oil, the force necessary to move a static piston remains applied after the piston has begun moving, thereby causing the piston to accelerate. The acceleration causes the piston to jerk, somewhat erratically. By way of an example, a hydraulic elevator having an elevator car constrained to motion within a hoistway is powered by a hydraulic cylinder. If stiction is present, a passenger in the elevator will experience a jarring sensation as the car goes from a static state at a landing to a dynamic state leaving the landing. Any abrupt fluctuation in elevator motion is perceived as an indicia of poor quality. Hence, it is desirable to minimize or eliminate stiction in a fluid cylinder.

DISCLOSURE OF THE INVENTION

It is, therefore, an object of the present invention to eliminate potential erratic behavior of a fluid cylinder as it changes from a static state to a dynamic state.

According to the present invention, a method for reducing seal stiction in a fluid power cylinder is provided. A fluid cylinder comprising a piston displacably mounted in a housing is provided in a first step. The housing has both a first and second seal in register with the piston. In a second step, the second seal is applied against the piston to maintain pressure in the housing while the piston is in a static state. In a third step, the first seal is applied to maintain pressure in the housing prior to displacement of the cylinder, and the second seal is relaxed. In a fourth step, the second seal is applied to maintain pressure in the housing subsequent to the displacement of the piston and the first seal is relaxed.

According to another aspect of the present invention, an apparatus for reducing stiction in a fluid power cylinder is provided. The apparatus comprises means for applying one of a first or second seal in register with a piston displacably mounted in a housing containing pressurized fluid, and relaxing the other of the first or second seal before and after displacement of the piston.

An advantage of the present invention is that a change in pressure across a first seal and a second seal, which causes one of the first or second seal to be applied and the other to relax, significantly reduces the conditions which cause stiction in each seal.

A further advantage of the present invention is that it utilizes commercially available hydraulic cylinders.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
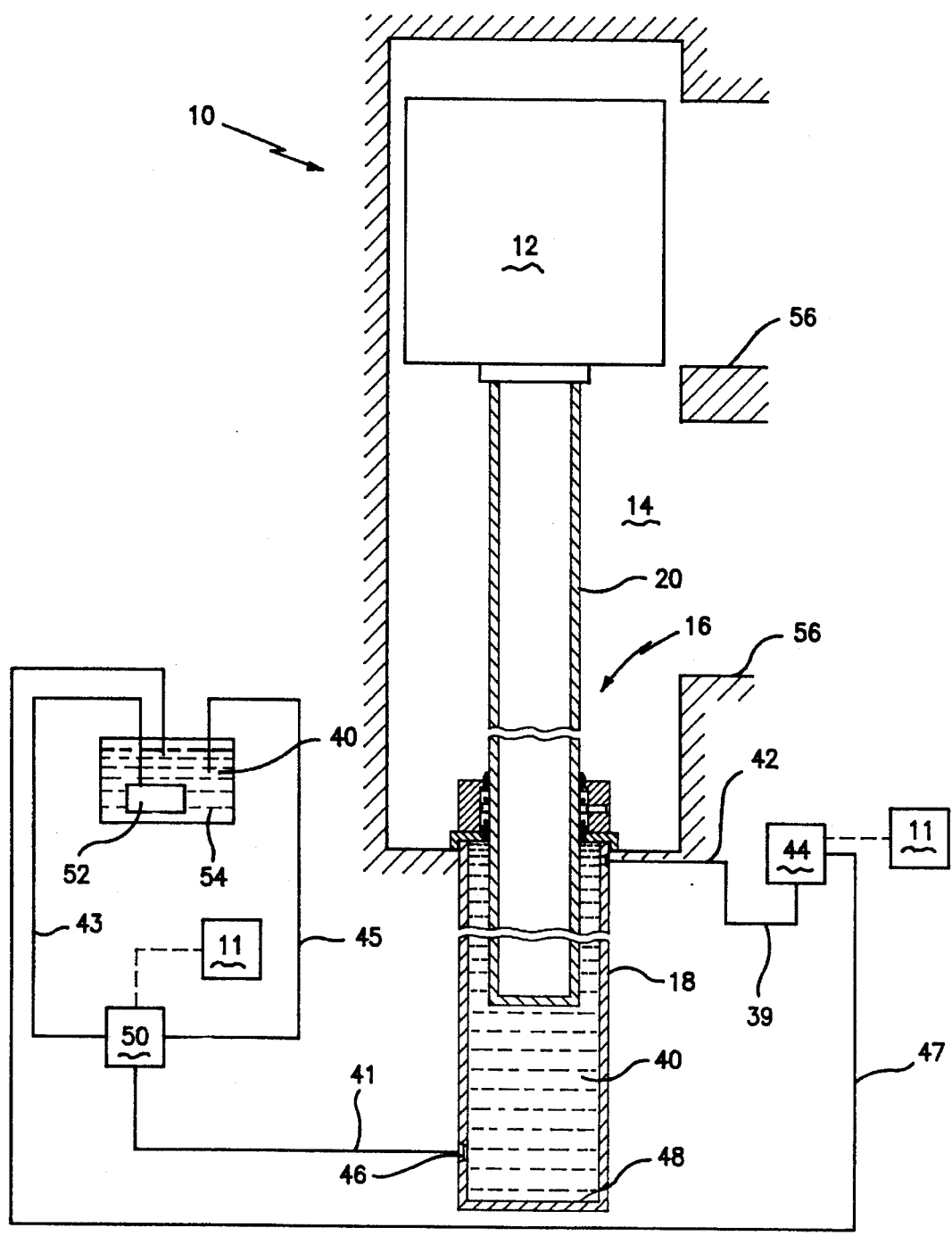
FIG. 1 is an diagrammatic view of an hydraulically powered elevator.
Figure 2:
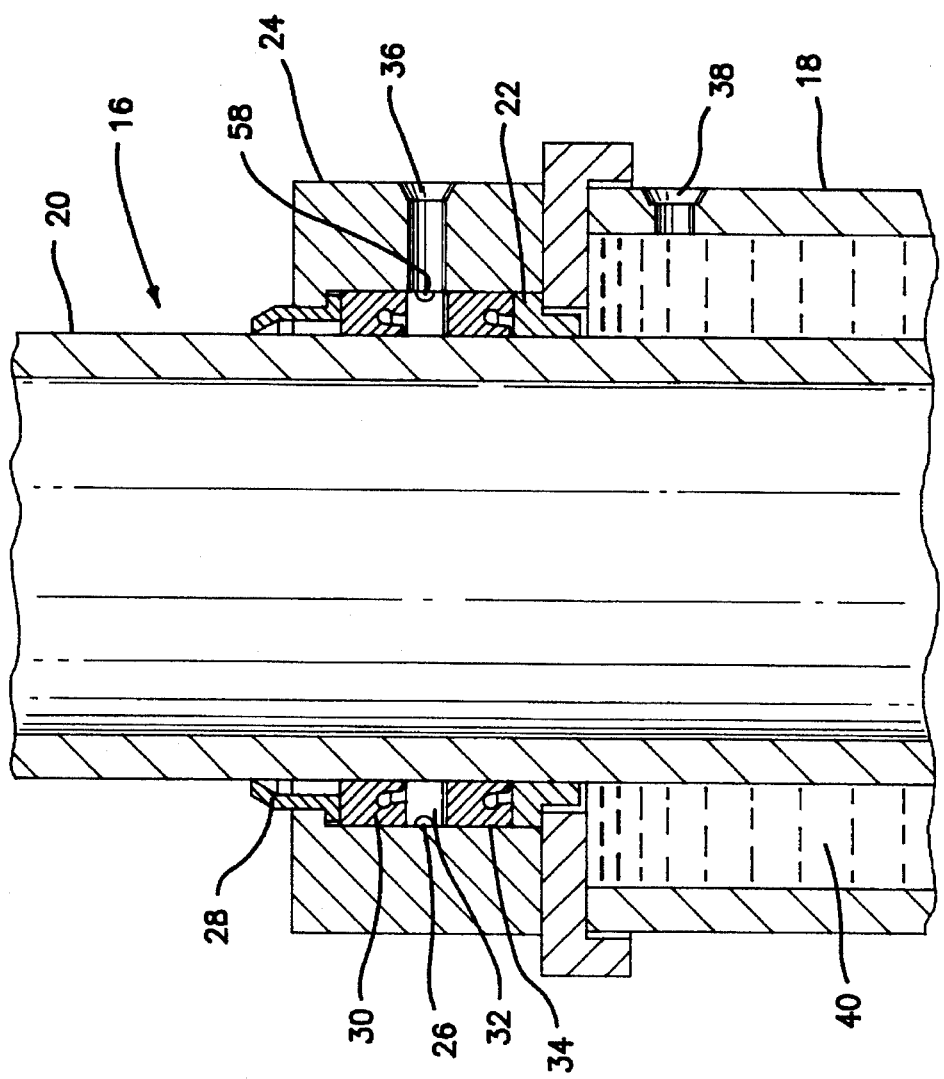
FIG. 2 is a sectional view of part of the hydraulic cylinder shown in FIG.1

Referring to FIGS. 1 and 2, an elevator 10 is shown having an elevator car 12 propelled through a hoistway 14 by a hydraulic cylinder 16. The hydraulic cylinder 16 comprises a housing 18 and a displacably mounted piston rod 20. At the top 21 of the housing 18, a bearing 22 helps maintain concentricity between the piston 20 and the housing 18. A cylinder head 24 fixed to the housing 18 holds the bearing 22 in place. As is known in the art, the cylinder head 24 includes a bore 26 in which a wiper ring 28, a first seal 30, a lantern ring 32, and a second seal 34 are packed. A first port 36 extends through the outside of the cylinder head 24 to the bore 26 at the position where the lantern ring 32 is mounted. In the preferred embodiment, the first seal 30 and second seal 34 are lip-type seals. The lantern ring 32 comprises several bores (not shown) which permit fluid 40 to freely distribute about the lantern ring 32, between the first seal 30 and second seal 34. A second port 38 extends through the housing 18 below the cylinder head 24 and the bearing 22 and allows access to the fluid 40 within the housing 18. Hydraulic line 39 extends from the second port 38 to a solenoid valve 44, and hydraulic line 42 extends from the solenoid valve 44 to the first port 36. Hydraulic line 47 extends from the solenoid valve 44 to the reservoir 54. A third port 46, typically located at the bottom 48 of the housing 18, is connected by hydraulic line 41 to an externally mounted control valve 50. The control valve 50 is connected by hydraulic line 43 to a pump 52 submerged in hydraulic fluid 40 held within a reservoir 54. Separate hydraulic line 45 extends from the control valve 50 back to the reservoir 54.

In the operation of the elevator 10, an electronic controller 11 is used to control the operation of the hydraulic cylinder 16 propelling the elevator car 12 through the hoistway 14. At rest, the hydraulic fluid 40 in the housing 18 of the cylinder 16 is pressurized by the weight of the elevator car 12, the piston 20, and attached peripheral elements (not shown). The control valve 50 prevents fluid 40 from returning to the reservoir 54, and thereby holds the elevator car 12 at a landing 56. The pressurized fluid 40 in the housing 18 creates a difference in pressure across the second seal 34, since the space 58 between the first seal 30 and the second seal 34 is normally at ambient pressure. The first seal 30, with ambient pressure on both sides, has no difference in pressure across it while the cylinder 16 is at rest.

When a call is made directing the car 12 to a higher floor, the controller 11 energizes the pump 52. The control valve 50 directs the output of the pump 52 back to the reservoir 54 until the output reaches a predetermined minimum pressure. When the pump is energized, the controller 11 also energizes the solenoid valve 44, thereby allowing fluid 40 from the second port 38 to enter the first port 36 about the lantern ring 32, between the first seal 30 and the second seal 34. As a result, the pressure difference across the second seal 34 is eliminated and a pressure difference is created across the first seal 30. Eliminating the pressure difference across the second seal 34 causes the second seal 34 to relax against the piston 20. Creating the pressure difference across the first seal 30 forces the first seal 30 against the piston 20. Before the first seal 30 has time to contour to the surface of the piston 20 and create the stiction problem, however, the controller 11 will have signaled the control valve 50 to begin admitting pressurized fluid 40 into the cylinder 16 and consequently set the piston rod 20 into motion. Some time later, the controller deenergizes the solenoid valve 44, thereby eliminating the source of high pressure fluid 40 between the first seal 30 and the second seal 34. At the same time, the solenoid valve 44 (in the deenergized state) allows the fluid 40 in between the first seal 30 and the second seal 34 to return to the reservoir 54 via hydraulic lines 42 and 47. The pressure difference across the second seal 34 is, therefore, recreated and the pressure difference across the first seal 30 is eliminated.

When a call is made directing the car 12 to a lower floor, the controller energizes the solenoid valve 44 a period of time before the elevator 12 is set into motion. Here again, the pressure difference across the second seal 34 is eliminated and a pressure difference across the first seal 30 is created. Eliminating the pressure difference across the second seal 34 causes the second seal 34 to relax against the piston 20. Creating the pressure difference across the first seal 30 forces the first seal 30 against the piston 20. Before the first seal 30 has time to contour to the surface of the piston 20 and create the stiction problem, the controller 11 will have signaled the control valve 50 will to begin allowing pressurized fluid 40 in the housing 18 to return to the reservoir 54 and consequently set the piston rod 20 into motion. Some time later, the controller deenergizes the solenoid valve 44, thereby eliminating the source of high pressure fluid 40 between the first seal 30 and second seal 34. At the same time, the solenoid valve 44 (in the deenergized state) allows the fluid 40 between the first seal 30 and second seal 34 to return to the reservoir 34 via hydraulic lines 42 and 47. The pressure difference across the second seal 34 is, therefore, recreated and the pressure difference across the first seal 30 is eliminated.

A person of ordinary skill in the art will recognize that heretofore the present invention has been described in terms of a single acting cylinder 16. The present invention may also be utilized in a double acting cylinder (not shown) where either side of a piston cap may be pressurized to accomplish motion under power in either linear direction.

Although this invention has been shown and described with respect to the detailed embodiments thereof, it will be understood by those skilled in the art that various changes in form and detail thereof may be made without departing from the spirit and scope of the claimed invention.

We claim:

1. A method for reducing seal stiction in a fluid cylinder, comprising the steps of:

providing a fluid cylinder, having
   a piston, displaceably mounted in a housing;
   a first and second seal, in register with said piston;
   a first pressure chamber between said seals, having a pressure P1;
   a second pressure chamber, separated from said first pressure chamber by said second seal, having a pressure P2, wherein said second seal is normally applied against said piston to maintain P2 in said second pressure chamber, and said first seal is normally relaxed;

applying said first seal against said piston and relaxing said second seal prior to displacement of said piston; and axially displacing said piston before said first seal is applied against said piston sufficiently to create significant stiction between said first seal and said piston.

2. A method for reducing seal stiction according to claim 1, further comprising the steps of:

applying said second seal against said piston during displacement of said piston to maintain P2 in said second pressure chamber;

relaxing said first seal after said second seal is applied enough to maintain P2 in said second pressure chamber.

3. A method for reducing seal stiction according to claim 2, wherein said seals are relaxed by equalizing the magnitude of pressure across the seals, and applied by creating a difference in pressure magnitude across the seals.

4. A method for reducing seal stiction according to claim 3, wherein said provided cylinder further comprises:

a first port, extending from outside said housing into said first pressure chamber;

a second port, extending from outside said housing into said second pressure chamber;

wherein fluid communicates with said chambers through said ports.

5. A method for reducing seal stiction according to claim 4, wherein said seals of said provided cylinder are lip-type seals.

6. A method for reducing seal stiction according to claim 5, wherein said first pressure chamber is defined by said seals, said piston, and said housing; and said second pressure chamber is defined by said second seal and said housing.

7. A method for reducing seal stiction according to claim 1, wherein said seals are relaxed by equalizing the magnitude of pressure across the seals, and applied by creating a difference in pressure magnitude across the seals.

8. A method for reducing seal stiction according to claim 7, wherein said provided cylinder further comprises:

a first port, extending from outside said housing into said first pressure chamber;

a second port, extending from outside said housing into said second pressure chamber;

wherein fluid communicates with said chambers through said ports.

9. A method for reducing seal stiction according to claim 8, wherein said seals of said provided cylinder are lip-type seals.

10. A method for reducing seal stiction according to claim 9, wherein said first pressure chamber is defined by said seals, said piston, and said housing; and said second pressure chamber is defined by said second seal and said housing.

* * * * *